United States Patent
Gardner et al.

(10) Patent No.: US 7,453,587 B2
(45) Date of Patent: Nov. 18, 2008

(54) METHOD FOR REMOVING STREAKS FROM A SCANNED IMAGE

(75) Inventors: William Everett Gardner, Louisville, KY (US); Du-Yong Ng, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 579 days.

(21) Appl. No.: 11/295,959

(22) Filed: Dec. 7, 2005

(65) Prior Publication Data

US 2007/0127840 A1 Jun. 7, 2007

(51) Int. Cl.
*G06F 15/00* (2006.01)
*G06K 1/00* (2006.01)
*H04N 1/38* (2006.01)
*G06F 3/12* (2006.01)

(52) U.S. Cl. .................... 358/1.1; 358/463
(58) Field of Classification Search ........... 358/1.1, 358/1.2, 1.6, 1.7, 1.8, 1.18, 463, 465
See application file for complete search history.

(56) References Cited

U.S. PATENT DOCUMENTS

| | | |
|---|---|---|
| 5,065,444 A | 11/1991 | Garber |
| 5,881,182 A | 3/1999 | Fiete et al. |
| 5,987,347 A | 11/1999 | Khoury et al. |
| 6,335,982 B1 | 1/2002 | Arai et al. |
| 6,393,161 B1 | 5/2002 | Stevenson et al. |
| 6,547,361 B1 | 4/2003 | Suzuki et al. |
| 6,646,681 B1 | 11/2003 | Macy et al. |
| 6,801,646 B1 | 10/2004 | Pena et al. |
| 6,822,766 B2 | 11/2004 | Hill et al. |
| 6,839,153 B1 | 1/2005 | Shimizu |
| 6,863,371 B2 | 3/2005 | Suzuki et al. |
| 6,870,959 B1 | 3/2005 | Jia et al. |
| 6,873,782 B2 | 3/2005 | Miller et al. |
| 6,912,322 B2 * | 6/2005 | Smith et al. .................. 382/275 |
| 7,292,365 B2 * | 11/2007 | Knox ......................... 358/1.16 |

* cited by examiner

*Primary Examiner*—Douglas Q Tran (57) ABSTRACT

A method for removing streaks from a scanned image includes performing a scanner light source OFF scan to generate a dark image having M rows of pixels and N+W columns of pixels; generating a line noise profile for the N columns of pixels of the dark image; performing a scanner light source ON scan to generate a regular image having M rows of pixels and N+W columns of pixels; processing the W columns of pixels of the regular image to detect a magnitude of the streak in the regular image; use the magnitude of the streak and the line noise profile to predict an amount of dark noise removal for each of the N columns of pixels of the regular image at the location of the streak; and subtracting the predicted amount of dark noise removal for each of the N columns of pixels from the respective N columns of pixels of the regular image.

14 Claims, 6 Drawing Sheets

METHOD FOR REMOVING STREAKS FROM A SCANNED IMAGE

BACKGROUND OF THE INVENTION

1. Field of the Invention

The present invention relates to a scanner, and, more particularly, to a method for removing streaks from a scanned image.

2. Description of the Related Art

Streaks are often present in many scanned images. Such streaks may appear in the form of periodic horizontal lines in a scanned image. The visibility of the streaks varies with scanners and the content of the scanned image. For many low cost scanners, for example, the streaks can appear to be very objectionable in the scanned image, particularly in constant mid-tone regions of the image.

SUMMARY OF THE INVENTION

The present invention provides an effective method to remove streaks from a scanned image. As used herein, the term "remove streaks" means a reduction of the visual impact of streaks from the scanned image, and may result in the total elimination of the streaks.

The invention, in one exemplary embodiment, is directed to a method for use in a scanner with a scan bar having a sensor defining N+W pixels in a row, wherein the N pixels are content pixels that are exposed to a scanner light source and the W pixels are non-content pixels that are not exposed to the scanner light source, each pixel being represented by data. The method provides for removing streaks from a scanned image. The method includes performing a scanner light source OFF scan to generate a dark image having M rows of pixels and N+W columns of pixels; generating a line noise profile for the N columns of pixels of the dark image; performing a scanner light source ON scan to generate a regular image having M rows of pixels and N+W columns of pixels; determining a location of a streak in the regular image; processing the W columns of pixels of the regular image to detect a magnitude of the streak in the regular image; use the magnitude of the streak and the line noise profile to predict an amount of dark noise removal for each of the N columns of pixels of the regular image at the location of the streak; and subtracting the predicted amount of dark noise removal for each of the N columns of pixels from the respective N columns of pixels of the regular image to remove the streak.

The invention, in another exemplary embodiment, is directed to an imaging apparatus. The imaging apparatus includes a scanner and a controller. The scanner has a scan bar having a scanner light source and a sensor defining N+W pixels in a row, wherein the N pixels are content pixels that are exposed to the scanner light source and the W pixels are non-content pixels that are not exposed to the scanner light source. Each pixel is represented by data. The controller is coupled to the scanner. The controller executes program instructions to perform a method for removing streaks from a scanned image, including performing a scanner light source OFF scan to generate a dark image having M rows of pixels and N+W columns of pixels; generating a line noise profile for the N columns of pixels of the dark image; performing a scanner light source ON scan to generate a regular image having M rows of pixels and N+W columns of pixels; determining a location of a streak in the regular image; processing the W columns of pixels of the regular image to detect a magnitude of the streak in the regular image; use the magnitude of the streak and the line noise profile to predict an amount of dark noise removal for each of the N columns of pixels of the regular image at the location of the streak; and subtracting the predicted amount of dark noise removal for each of the N columns of pixels from the respective N columns of pixels of the regular image to remove the streak.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
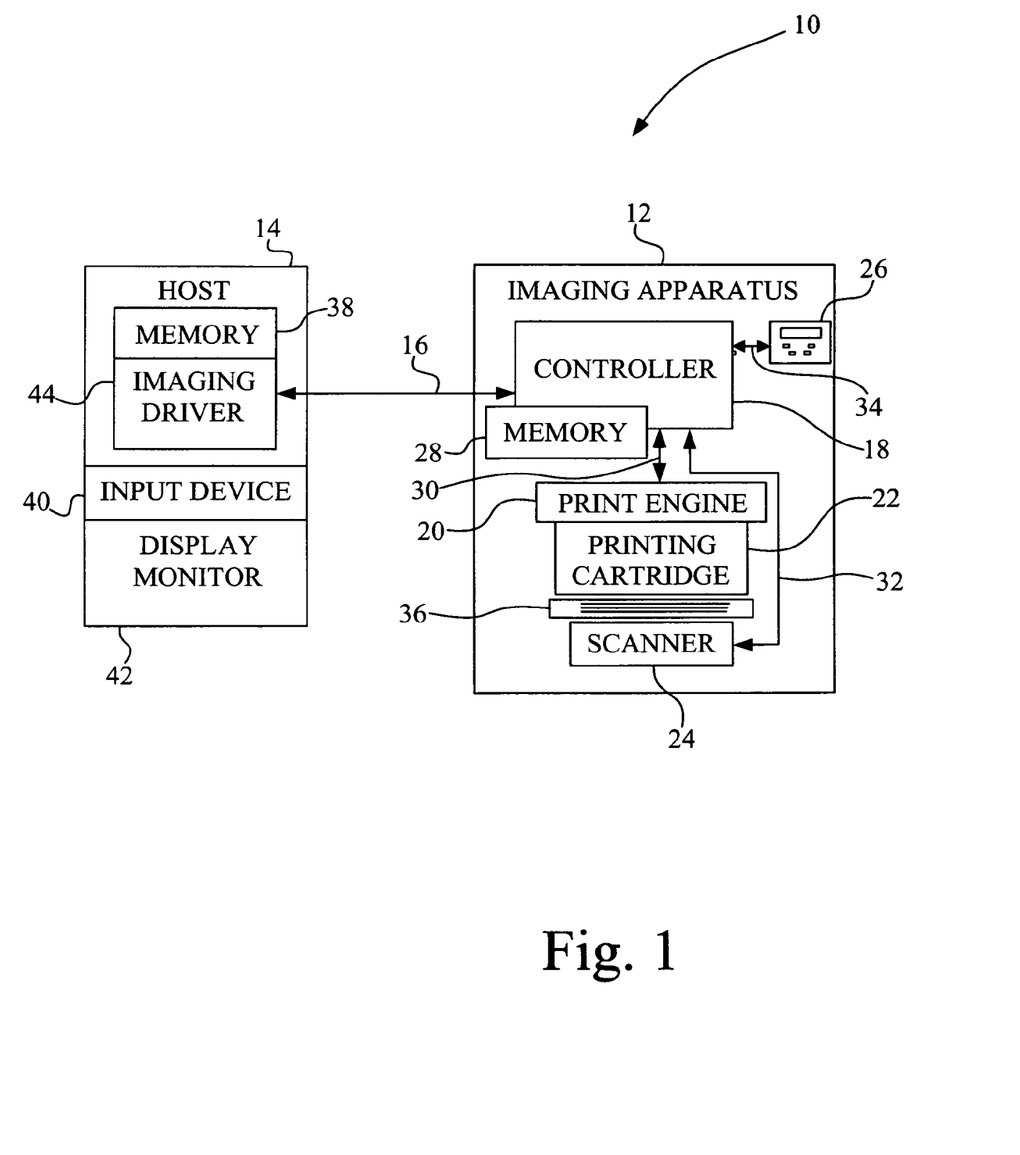
FIG. 1 is a diagrammatic depiction of an imaging system that employs an imaging apparatus in accordance with the present invention.

Referring now to the drawings, and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16.

As used herein, the term "communications link" generally refers to structure that facilitates electronic communication between two components, and may operate using wired or wireless technology. Accordingly, communications link 16 may be, for example, a direct electrical wired connection, a direct wireless connection (e.g., infrared or radio frequency (r.f.)), or a network connection (wired or wireless), such as for example, an Ethernet local area network (LAN) or a wireless networking standard, such as IEEE 802.11.

Imaging apparatus 12 may be, for example, a standalone scanner; an ink jet printer and/or copier, or an electrophotographic printer and/or copier that is used in conjunction with a scanner; or an all-in-one (AIO) unit that includes a printer, a scanner, and possibly a fax unit. In the present embodiment, imaging apparatus 12 is an AIO unit, and includes a controller 18, a print engine 20, a printing cartridge 22, a scanner 24, and a user interface 26.

Controller 18 includes a processor unit and associated memory 28, and may be formed as one or more Application Specific Integrated Circuits (ASIC). Controller 18 may be a printer controller, a scanner controller, or may be a combined printer and scanner controller. Although controller 18 is depicted in imaging apparatus 12, alternatively, it is contemplated that all or a portion of controller 18 may reside in host 14. Controller 18 is communicatively coupled to print engine 20 via a communications link 30, to scanner 24 via a communications link 32, and to user interface 26 via a communications link 34. Controller 18 serves to process print data and to operate print engine 20 during printing, and in accordance with an embodiment of the present invention, serves to operate scanner 24 and process raw scanner data to perform streaks detection and streaks removal on the raw scanner data.

In the context of the examples for imaging apparatus 12 given above, print engine 20 may be, for example, an ink jet print engine or a color electrophotographic print engine. Print engine 20 is configured to mount printing cartridge 22 and to print on a substrate 36 using printing cartridge 22. Substrate 36 is a print medium, and may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement displays and the like. As an ink jet print engine, print engine 20 operates printing cartridge 22 to eject ink droplets onto substrate 36 in order to reproduce text or images, etc. As an electrophotographic print engine, print engine 20 causes printing cartridge 22 to deposit toner onto substrate 36, which is then fused to substrate 36 by a fuser (not shown).

Host 14 may be, for example, a personal computer, including memory 38, an input device 40, such as a keyboard, and a display monitor 42. Host 14 further includes a processor, input/output (I/O) interfaces, memory, such as RAM, ROM, NVRAM, and at least one mass data storage device, such as a hard drive, a CD-ROM and/or a DVD unit.

During operation, host 14 includes in its memory a software program including program instructions that function as an imaging driver 44, e.g., printer/scanner driver software, for imaging apparatus 12. Imaging driver 44 is in communication with controller 18 of imaging apparatus 12 via communications link 16. Imaging driver 44 facilitates communication between imaging apparatus 12 and host 14, and may provide formatted print data to imaging apparatus 12, and more particularly, to print engine 20. Although imaging driver 44 is disclosed as residing in memory 38 of host 14, it is contemplated that, alternatively, all or a portion of imaging driver 44 may be located in controller 18 of imaging apparatus 12.

Figure 2:
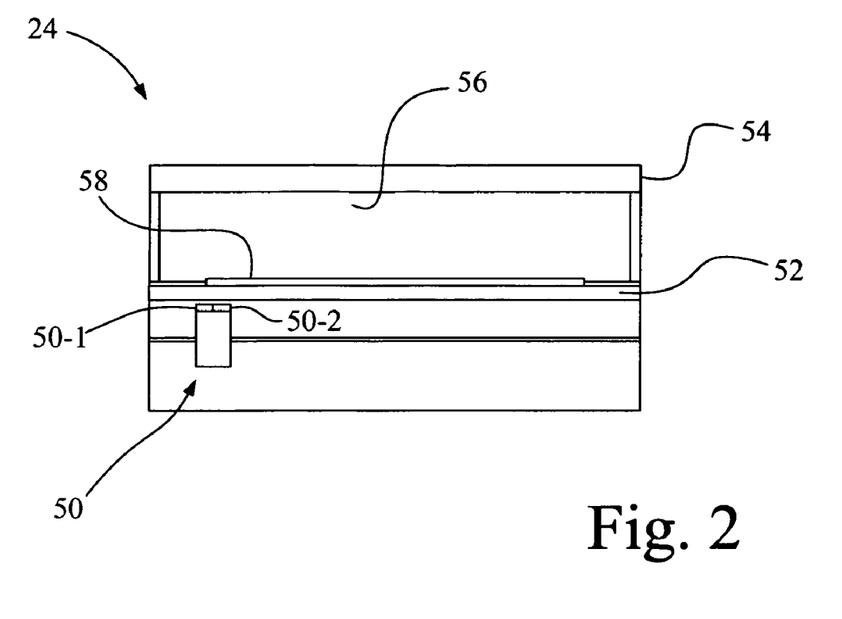
FIG. 2 is a diagrammatic representation of an embodiment of the scanner used in the imaging system of FIG. 1.

Referring to FIG. 2, scanner 24 may be, for example, in the form of a flat bed scanner. Those skilled in the art will recognize, however, that other types of scanners may be used in accordance with the present invention. Scanner 24, as a flat bed scanner, includes a scan bar 50, a document glass 52 and a lid 54. FIG. 2 shows scanner 24 with lid 54 in an open position. Lid 54 includes a surface that forms a background 56 for a document 58 being scanned. During operation, lid 54 is lifted, document 58 to be scanned is placed on document glass 52, and then lid 54 is closed. Scan bar 50, including a scanner light source 50-1, having one or more illuminants, e.g., lamps, LED arrays, etc., and including a sensor 50-2, having one or more sensor arrays, then is scanned over the stationary document 58 to collect raw scanner image data. In an alternative embodiment, for example, scan bar 50 may be held stationary and the document moved in relation to the scan bar.

Figure 3:
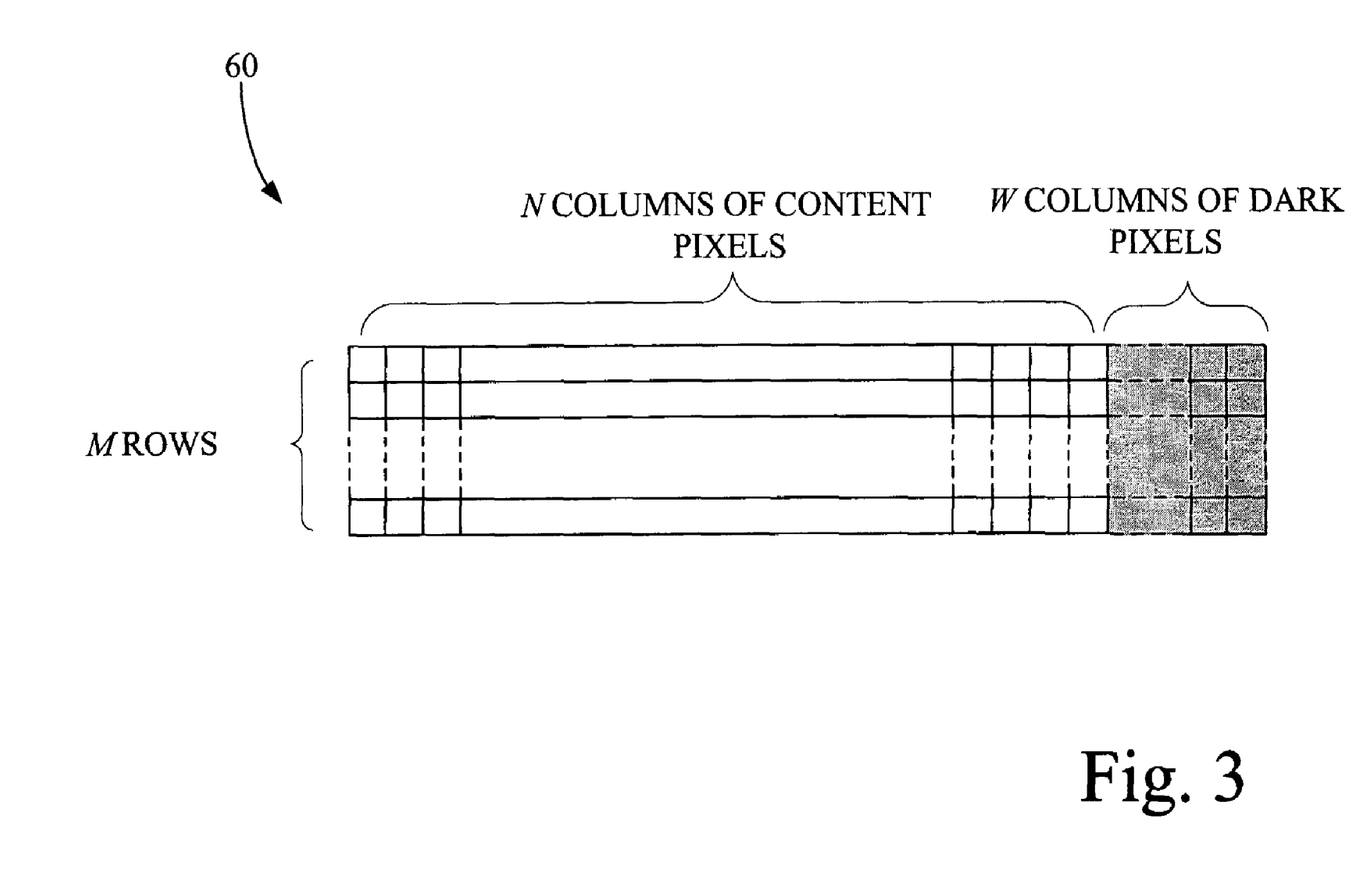
FIG. 3 is a diagrammatic representation of a scanning area, including a plurality of columns of content pixels and a plurality of columns of dark pixels, associated with the sensor of the scanner of FIG. 2

As illustrated in FIG. 3, sensor 50-2 of scan bar 50 of scanner 24 defines N+W columns of pixels along each row of a plurality of rows M in a scanning area 60. In this example, the N columns of pixels are content pixels associated with sensor 50-2 that are exposed to scanner light source 50-1 and the W columns of pixels are non-content pixels associated with sensor 50-1 that are not exposed to scanner light source 50-2. Each pixel, i.e., either the N pixels or the W pixels, is represented by data obtained as an output from sensor 50-2.

Figure 4:
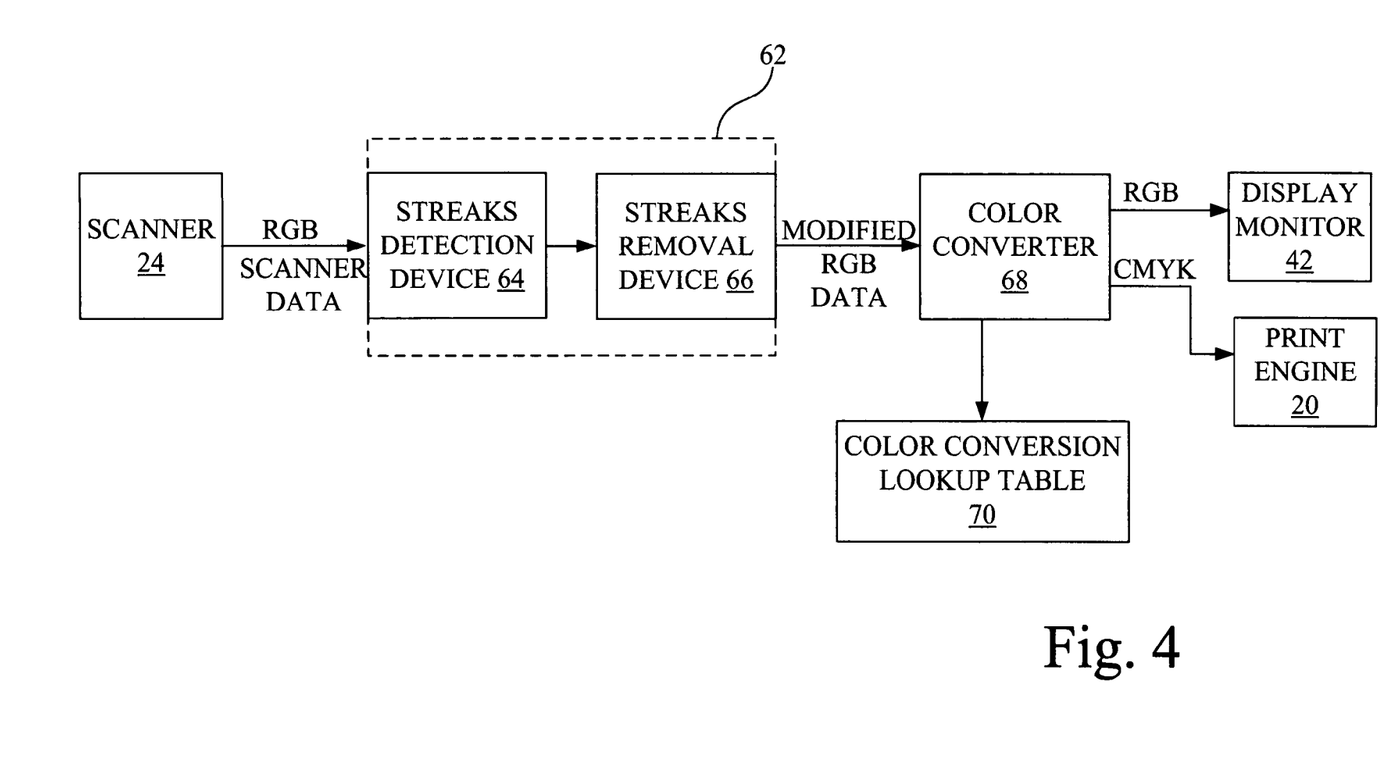
FIG. 4 is a diagrammatic depiction of an embodiment of the present invention having a streaks detection device and a streaks removal device provided upstream of a color converter.

FIG. 4 is a diagrammatic depiction of a scanner data processing apparatus 62 configured in accordance with an embodiment of the present invention, which may be implemented, for example, in imaging driver 44. However, it is contemplated that all or a portion of scanner data processing apparatus 62 may be implemented as software, firmware, or hardware, in one or more of imaging driver 44, controller 18 or host 14. Scanner data processing apparatus 62 includes a streaks detection device 64, a streaks removal device 66, a color converter 68 and a color conversion lookup table 70.

In the embodiment shown in FIG. 4, scanner 24 provides raw RGB (red, green, blue) scanner data as input to streaks detection device 64. Once streaks are detected by streaks detection device 64, the raw RGB scanner data is processed by streaks removal device 66. In one implementation of an embodiment of the present invention, for example, streaks detection device 64 and streaks removal device 66 may be incorporated into imaging driver 44. Accordingly, streaks detection device 64 and streaks removal device 66 processes the raw RGB scanner data received from scanner 24, and converts the raw RGB scanner data into modified, i.e., streak reduced, RGB data in a data format compatible with color converter 68.

Color converter 68 converts color signals from a first color space to a second color space. For example, the first color space may be RGB color space providing RGB data and the second color space may be CMYK (cyan, magenta, yellow, and black) color space that outputs CMYK output data for print engine 20. The second color space may also be an RGB color space, for example, if the desired output of imaging apparatus 12 is a scan-to-file replication of an image that might be displayed on display monitor 42. Those skilled in the art will recognize that color converter 68 may be in the form of firmware, hardware or software, and may reside in either imaging driver 44 or controller 18. Alternatively, some portions of color converter 68 may reside in imaging driver 44, while other portions reside in controller 18.

Color converter 68 is coupled to a color conversion lookup table 70. Color converter 68 uses color conversion lookup table 70 in converting color signals from the first color space, e.g., RGB data, to output color data in the second color space. Color conversion lookup table 70 may be a multidimensional lookup table having at least three dimensions, and may include RGB input values and CMYK or RGB output values, wherein each CMYK or RGB output value corresponds to an RGB input value. Color conversion lookup table 70 may also be in the form of groups of polynomial functions capable of providing the same multidimensional output as if in the form of a lookup table.

Figure 5:
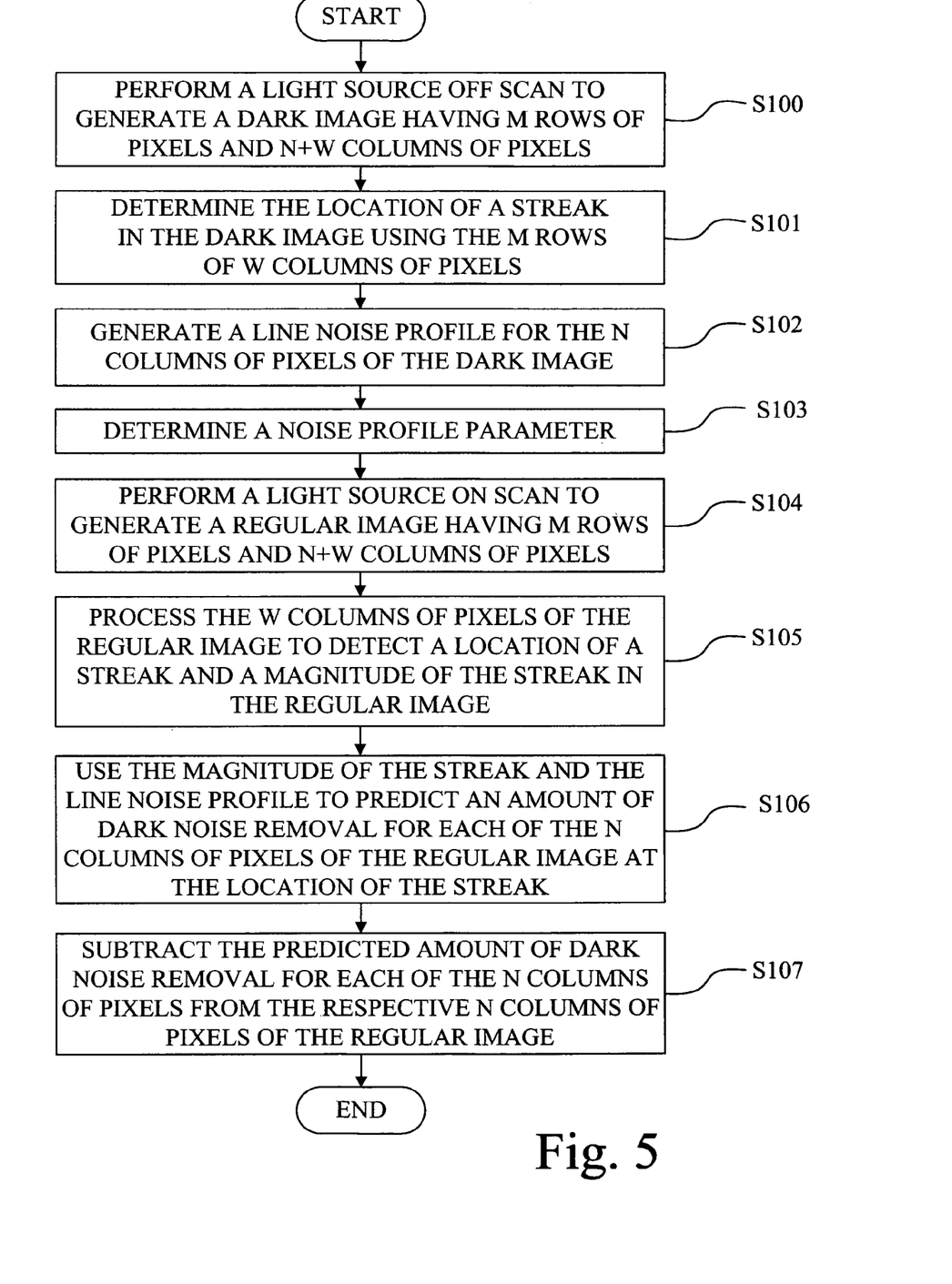
FIG. 5 is a flowchart of a method according to an embodiment of the present invention.
Figure 6A:
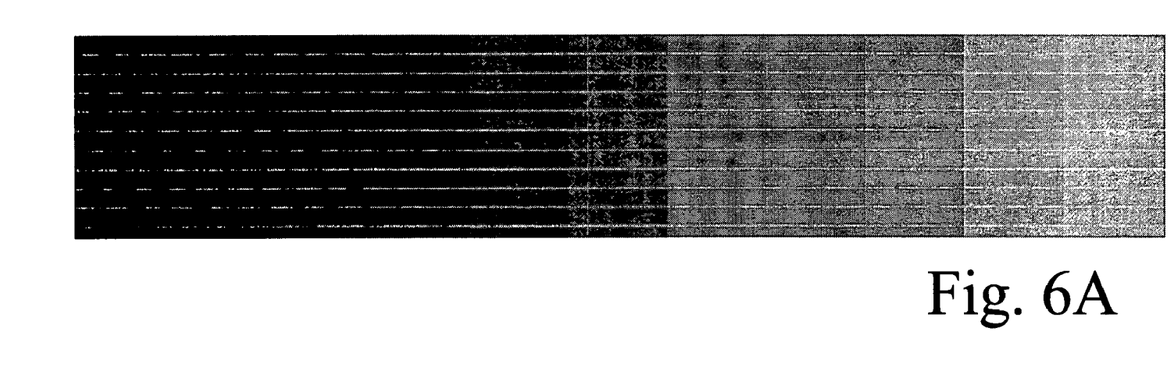
FIG. 6A illustrates an image formed by a plurality of color patches having objectionable streaks in the form of horizontal lines prior to streak removal.

FIG. 5 is a flowchart of a method for removing streaks from a scanned image according to an embodiment of the present invention. FIG. 6A illustrates an image formed by a plurality of color patches having objectionable streaks in the form of horizontal lines prior to streak removal. The method may be implemented, for example, by program instructions executed by the processor of controller 18 of imaging apparatus 12 and/or the processor of host 14, and may be, for example, included in whole or in part in imaging driver 44.

The location of a horizontal streak in an image corresponds to the row of pixels where sensor 50-2 of scan bar 50 slows down or stops temporarily. If the present invention is implemented in the scanner as a hardware solution, it is straightforward to determine the locations of the streaks because the positions where the sensor 50-2 of scan bar 50 slows down or stop are readily available. Where a software and/or firmware solution is needed, the present invention provides a streak detection algorithm that utilizes dark pixel information. In the method steps of the example that follows, it is assumed that a software and/or firmware solution is needed.

In this example, it is assumed that there are M×(N+W) pixels in the raw scanner data, i.e., the image data, wherein M is the number of rows of pixels and (N+W) is the number of columns of pixels, and wherein W represents the image "dark pixels" which are not exposed to scanner light.

At step S100, a light source OFF scan is performed to generate a dark image having M rows of pixels and N+W columns of pixels.

At step S101, the location of a streak in the dark image using the M rows of the W columns of pixels.

A pattern map can be extracted by finding the projection of the M×W dark image averaged over all the Red (R), Green (G) and Blue (B) channels along the horizontal direction:

$$proj(i) = \frac{1}{3} \cdot \sum_{j=N+1}^{N+W} (p_R(i,j) + p_G(i,j) + p_B(i,j)), \quad \text{(Equation 1)}$$

$$\forall i \in \{1, \Lambda\ M\}$$

where $p_C(i, j)$ denotes the value of channel C of pixel p at spatial location (i, j) and $C \in \{R, G, B\}$ The local average of the pattern map can be calculated as:

$$proj_{avg}(i) = \frac{1}{l1+l2} \sum_{k=-l1}^{l2} proj(i+k), \forall i \in \{1, \Lambda\ M\} \quad \text{(Equation 2)}$$

where l1<M and l2<M.

An appropriate boundary condition can be applied to Equation 2 to get a representative average for each of the two end intervals. For example, Let I denote the set of i's with $proj(i) > proj_{avg}(i)$. The average of proj for all $i \in I$ can be calculated as:

$$mean_I = \sum_{i \in I} proj(i) \quad \text{(Equation 3)}$$

The position of each streak is given by:

$$\tilde{i} = \{\bar{i}: proj(\bar{i}) > \gamma \cdot mean_I \text{ and } \bar{i} \in I\} \quad \text{(Equation 4)}$$

where γ is a parameter that can be varied as desired or determined experimentally.

At step S102, a line noise profile for the N columns of pixels of the dark image $img^{dark}$ is generated. The average line noise profile LineNP across sensor 50-2 of scan bar 50 for each or the R, G and B channels can be estimated as:

$$LineNP_R(j) = \frac{1}{H} \cdot \sum_{\substack{i \in \{1, \Lambda\ M\} \\ i \notin \tilde{I}^{dark}}} p_R^{dark}(i,j) \quad \text{(Equation 5)}$$

$$LineNP_G(j) = \frac{1}{H} \cdot \sum_{\substack{i \in \{1, \Lambda\ M\} \\ i \notin \tilde{I}^{dark}}} p_G^{dark}(i,j)$$

$$LineNP_B(j) = \frac{1}{H} \cdot \sum_{\substack{i \in \{1, \Lambda\ M\} \\ i \notin \tilde{I}^{dark}}} p_B^{dark}(i,j)$$

where $p^{dark}$ is a pixel of $img^{dark}$, $j \in \{1, \Lambda\ N\}$ and H is the total number of rows that do not contain streaks.

At step S103, a noise profile parameter $\alpha_C^{opt}$ is determined.

The sensitivity of the sensor pixels of sensor 50-2 may vary quite significantly from pixel to pixel. As a result, the amount of dark noise accumulated in each sensor pixel may also vary significantly given the same amount of exposure time. To remove the streaks, not only the location of the streak is needed but also how much of the dark noise needs to be subtracted from the affected pixels. Since the dark sensor pixels W are exposed as long as the content sensor pixels N, the noise level of the dark sensor pixels W may be used to predict the dark noise accumulated in the content sensor pixels N using the noise profile parameter $\alpha_C^{opt}$ which is computed by taking the following steps.

i) Noise profile parameter estimation (perform this step offline and only once for the scanner using a dark image)
  a) Perform a scan with the scanner light OFF to obtain an M×(N+W) dark image $img^{dark}$.
  b) Locate the position of the streaks as described above.
  c) Let $proj^{dark}$, $proj_{avg}^{dark}$ and $mean_{\tilde{I}^{dark}}$ denote the parameters for the $img^{dark}$ computed using Equations 1, 2 and 3 respectively. Here, $\tilde{I}^{dark}$ is the set of $\tilde{i}^{dark}$'s found for $img^{dark}$ using Equation 4.
  d) Find the projection of the dark pixels along the horizontal direction for each channel $$proj_C^{dark}(i) = \sum_{j=N+1}^{N+W} p_C^{dark}(i,j), \forall i \in \{1, \Lambda\ M\} \quad \text{(Equation 6)}$$

where $p_C^{dark}(i, j)$ denotes the value of channel C of pixel $p^{dark}$ at spatial location (i, j) and $C \in \{R, G, B\}$
  e) Calculate $proj_{C\ avg}^{dark}$ using $proj_C^{dark}$ and Equation 2.
  f) Compute the amplitude of $proj_C^{dark}(\tilde{i}^{dark})$ at rows that contain streaks for each channel:

$$s_C^{dark}(\tilde{i}^{dark}) = \quad \text{(Equation 7)}$$

$$\begin{cases} proj_C^{dark}(\tilde{i}^{dark}) - & \text{if } proj_C^{dark}(\tilde{i}^{dark}) > \\ proj_{avg}^{dark}(\tilde{i}^{dark}), & proj_{avg}^{dark}(\tilde{i}^{dark}) \\ 0 & \text{otherwise} \end{cases}$$

for all $\tilde{i}^{dark} \in \tilde{I}^{dark}$
  g) Estimate the noise profile parameter $\alpha_C^{opt}$ for each channel by solving the following optimization equation:

$$\alpha_C^{opt} = \qquad \text{(Equation 8)}$$

$$\operatorname*{argmin}_{\alpha \in R} \left\{ \sum_{\substack{\bar{i}^{dark} \in I^{dark} \\ s_C^{dark}(\bar{i}^{dark}) \neq 0}} \sum_{j=1}^{N} \left\| \begin{array}{c} p^{dark}(\bar{i}^{dark}, j) - \alpha \cdot \\ s_C^{dark}(\bar{i}^{dark}) \cdot LineNP_C(j) \end{array} \right\| \right\}$$

where $C \in \{R, G, B\}$

Steps S100-S103 are performed only once, offline.

At step S104, a light source ON scan to generate a regular image having M rows of pixels and N+W columns of pixels is performed. This is illustrated, for example, in FIG. 3.

At step S105, the W columns of pixels of the regular image are processed to detect a location of a streak and a magnitude of the streak in the regular image.

A pattern map can be extracted by finding the projection of the M×W dark image averaged over all the Red (R), Green (G) and Blue (B) channels along the horizontal direction:

$$proj(i) = \frac{1}{3} \cdot \sum_{j=N+1}^{N+W} (p_R(i,j) + p_G(i,j) + p_B(i,j)), \qquad \text{(Equation 1)}$$

$$\forall i \in \{1, \Lambda\ M\}$$

where $p_C(i,j)$ denotes the value of channel C of pixel p at spatial location (i,j) and $C \in \{R, G, B\}$ The local average of the pattern map can be calculated as:

$$proj_{avg}(i) = \frac{1}{l1 + l2} \sum_{k=-l1}^{l2} proj(i+k), \forall i \in \{1, \Lambda\ M\} \qquad \text{(Equation 2)}$$

where l1<M and l2<M.

An appropriate boundary condition can be applied to Equation 2 to get a representative average for each of the two end intervals. For example, Let I denote the set of i's with $proj(i) > proj_{avg}(i)$. The average of proj for all $i \in I$ can be calculated as:

$$mean_I = \sum_{i \in I} proj(i) \qquad \text{(Equation 3)}$$

The position of each streak is given by:

$$\bar{I} = \{\bar{i}: proj(\bar{i}) > \gamma \cdot mean_I \text{ and } \bar{i} \in I\} \text{(Equation 4)}$$

where γ is a parameter that can be varied as desired or determined experimentally.

At step S106, the magnitude of the streak and the line noise profile are used to predict an amount of dark noise removal for each of the N columns of pixels of the regular image at the location of the streak. This step is performed for every scanned image to remove the streaks.

The amount of dark noise to be subtracted from the content pixel portion of the image to remove the streaks is the amount required to suppress the contrast in the corresponding dark pixel portion of the image, which is $$n_C(\bar{i}, j) = \alpha_C^{opt} \cdot s_C(\bar{i}) \cdot LineNP_C(j) \qquad \text{(Equation 9)}$$

At step S107, the predicted amount of dark noise removal for each of the N columns of pixels is subtracted from the respective N columns of pixels of the regular image. The pixel of the final image with streaks removed at spatial location (i, j) is given by:

$$p_C(i,j) = \begin{cases} p_C(i,j) - n_C(i,j), & \text{if } i \in \bar{I} \\ p_C(i,j), & \text{otherwise} \end{cases} \qquad \text{(Equation 10)}$$

for $j = 1, \Lambda, N$

If the dark noise characteristic of the dark pixels is not closely representative of that of the content pixels, $s_C(\bar{i})$ can be tuned to produce more conservative results as follows:

$$s_C(\bar{i}) = \begin{cases} s_C(\bar{i}), & \text{if } s_C(\bar{i}) \leq T_C + \beta \cdot D_C(\bar{i}) \\ T_C + \beta \cdot D_C(\bar{i}), & \text{otherwise} \end{cases} \qquad \text{(Equation 11)}$$

where $T_C = mean(\{s_C(\bar{i}): \bar{i} \in \bar{I}\})$, $D_C = s_C(\bar{i}) - T_C$ and $0 \leq \beta \leq 1$ The parameter β can be tuned to reduce the amount of dark noise to be subtracted from the content pixels. This will prevent excessive dark noise subtraction from the content pixels that may introduce undesirable artifacts. Steps S104-S107 are performed for every scanned image.

Figure 6B:
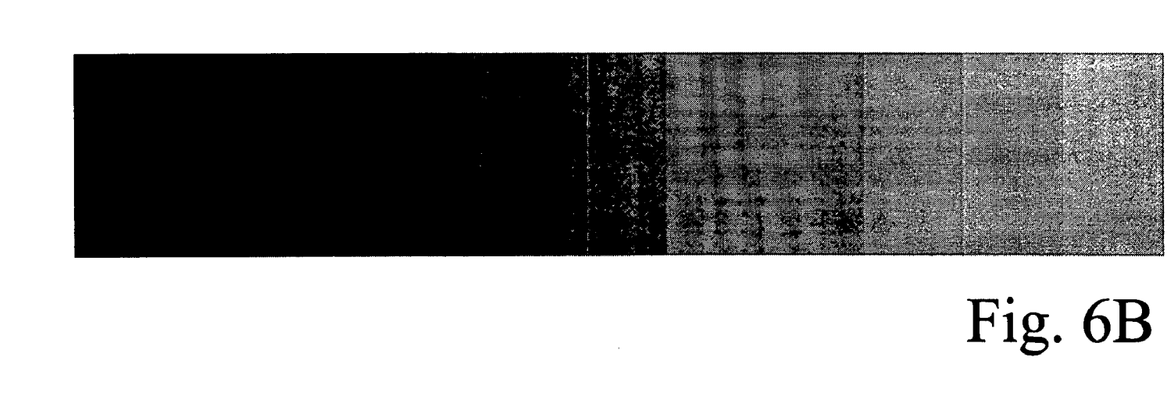
FIG. 6B illustrates the image of FIG. 6A having the objectionable streaks removed in accordance with an embodiment of the present invention.

FIG. 6B illustrates the image of FIG. 6A having the objectionable streaks removed in accordance with the embodiment of the present invention described above.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a scanner with a scan bar having a sensor defining N+W pixels in a row, wherein the N pixels are content pixels that are exposed to a scanner light source and the W pixels are non-content pixels that are not exposed to said scanner light source, each pixel being represented by data, a method for removing streaks from a scanned image, comprising:

performing a scanner light source OFF scan to generate a dark image having M rows of pixels and N+W columns of pixels;

generating a line noise profile for said N columns of pixels of said dark image;

performing a scanner light source ON scan to generate a regular image having M rows of pixels and N+W columns of pixels;

determining a location of a streak in said regular image;

processing said W columns of pixels of said regular image to detect a magnitude of said streak in said regular image;

using said magnitude of said streak and said line noise profile to predict an amount of dark noise removal for each of said N columns of pixels of said regular image at said location of said streak; and subtracting the predicted amount of dark noise removal for each of said N columns of pixels from the respective N columns of pixels of said regular image to remove said streak.

2. The method of claim 1, further comprising determining a location of a streak in said dark image using said M rows of W columns of pixels prior to said generating said line noise profile.

3. The method of claim 1, further comprising determining a noise profile parameter used to predict said amount of dark noise removal for each of said N columns of pixels of said regular image at said location of said streak.

4. The method of claim 1, wherein said location of said streak in said regular image is determined by processing said W columns of pixels of said regular image.

5. The method of claim 1, further comprising adjusting said amount of dark noise to be subtracted from said respective N columns of pixels of said regular image.

6. The method of claim 1, wherein said data is RGB color data.

7. The method of claim 1, wherein said streak comprises a plurality of horizontal streaks.

8. An imaging apparatus, comprising:
   a scanner with a scan bar having a scanner light source and a sensor defining N+W pixels in a row, wherein the N pixels are content pixels that are exposed to said scanner light source and the W pixels are non-content pixels that are not exposed to said scanner light source, each pixel being represented by data; and
   a controller coupled to said scanner, said controller executing program instructions to perform a method for removing streaks from a scanned image, comprising:
   performing a scanner light source OFF scan to generate a dark image having M rows of pixels and N+W columns of pixels;
   generating a line noise profile for said N columns of pixels of said dark image;
   performing a scanner light source ON scan to generate a regular image having M rows of pixels and N+W columns of pixels;
   determining a location of a streak in said regular image;
   processing said W columns of pixels of said regular image to detect a magnitude of said streak in said regular image;
   using said magnitude of said streak and said line noise profile to predict an amount of dark noise removal for each of said N columns of pixels of said regular image at said location of said streak; and
   subtracting the predicted amount of dark noise removal for each of said N columns of pixels from the respective N columns of pixels of said regular image to remove said streak.

9. The imaging apparatus of claim 8, further comprising determining a location of a streak in said dark image using said M rows of W columns of pixels prior to said generating said line noise profile.

10. The imaging apparatus of claim 8, further comprising determining a noise profile parameter used to predict said amount of dark noise removal for each of said N columns of pixels of said regular image at said location of said streak.

11. The imaging apparatus of claim 8, wherein said location of said streak in said regular image is determined by processing said W columns of pixels of said regular image.

12. The imaging apparatus of claim 8, further comprising adjusting said amount of dark noise to be subtracted from said respective N columns of pixels of said regular image.

13. The imaging apparatus of claim 8, wherein said data is RGB color data.

14. The imaging apparatus of claim 8, wherein said streak comprises a plurality of horizontal streaks.

* * * * *